United States Patent
Wilson et al.

(10) Patent No.: US 9,217,477 B2
(45) Date of Patent: Dec. 22, 2015

(54) FRICTION CLUTCH SYSTEM

(71) Applicants: Patrick R. Wilson, Dewey, AZ (US); Kevin C. Payne, Prescott Valley, AZ (US); William F. Baty, Prescott Valley, AZ (US)

(72) Inventors: Patrick R. Wilson, Dewey, AZ (US); Kevin C. Payne, Prescott Valley, AZ (US); William F. Baty, Prescott Valley, AZ (US)

(73) Assignee: TNMJ CALIBER, LLC, Prescott, AZ (US)

( * ) Notice: Subject to any disclaimer, the term of this patent is extended or adjusted under 35 U.S.C. 154(b) by 0 days.

(21) Appl. No.: 13/966,188

(22) Filed: Aug. 13, 2013

(65) Prior Publication Data

US 2014/0138202 A1 May 22, 2014

Related U.S. Application Data

(63) Continuation-in-part of application No. 13/028,965, filed on Feb. 16, 2011, which is a continuation-in-part of application No. 12/813,273, filed on Jun. 10, 2010, now Pat. No. 8,430,222.

(60) Provisional application No. 61/257,341, filed on Nov. 2, 2009.

(51) Int. Cl.
*F16D 13/75* (2006.01)
*F16D 13/38* (2006.01)
*F16D 3/14* (2006.01)
*F16D 13/70* (2006.01)

(52) U.S. Cl.
CPC ............... *F16D 13/385* (2013.01); *F16D 3/14* (2013.01); *F16D 13/70* (2013.01); *F16D 13/757* (2013.01); *F16D 2013/706* (2013.01); *F16D 2300/22* (2013.01)

(58) Field of Classification Search
CPC ......... F16D 3/14; F16D 13/385; F16D 13/70; F16D 13/75; F16D 13/752; F16D 13/757; F16D 2013/706; F16D 2300/22
USPC .......... 192/30 V, 70.17, 70.19, 70.252, 70.27, 192/89.22–89.24, 110 B, 200, 201, 212, 192/FOR. 116
See application file for complete search history.

(56) References Cited

U.S. PATENT DOCUMENTS

| | | | | |
|---|---|---|---|---|
| 3,086,634 | A * | 4/1963 | Reed | 192/70.252 |
| 3,613,849 | A * | 10/1971 | Pape | 192/90 |
| 3,938,636 | A * | 2/1976 | Nerska | 192/70.252 |
| 4,207,972 | A * | 6/1980 | Zeidler | 192/70.252 |
| 4,640,400 | A * | 2/1987 | Nakane et al. | 192/70.252 |
| 5,513,736 | A * | 5/1996 | Mizukami | 192/70.252 |
| 6,347,694 | B1 * | 2/2002 | Szadkowski et al. | 192/30 V |
| 6,766,886 | B2 * | 7/2004 | Lyons et al. | 188/71.8 |

(Continued)

*Primary Examiner* — Josh Skroupa
(74) *Attorney, Agent, or Firm* — Lowe Graham Jones PLLC

(57) ABSTRACT

A friction clutch system mechanically couples a power source to a driven system of a vehicle to reduce the rotational inertia of the clutch system, provide torsional damping within the system, and minimize vibration (e.g., rattling) between a floater and a flywheel. For example, a damping assembly secured to the floater may engage a locator pin secured to the flywheel and thereby reduce vibration. The friction clutch system may include a first friction disc assembly directly engaged with a second friction disc assembly. The first disc assembly may include protuberances that extend axially from a hub assembly, which in turn may include damping springs and an internal splined region for coupling to a splined, driven shaft. The second friction disc assembly includes openings, which may take the form of radial slots, configured to engageably receive the protuberances.

19 Claims, 18 Drawing Sheets

(56) References Cited

U.S. PATENT DOCUMENTS

| | | | |
|---|---|---|---|
| 6,789,656 B2 * | 9/2004 | Uenohara | 192/70.252 |
| 6,814,207 B2 * | 11/2004 | Payne | 192/70.27 |
| 7,204,356 B2 * | 4/2007 | Fox | 192/70.19 X |
| 7,448,477 B2 * | 11/2008 | Kingston et al. | 188/71.8 |
| 7,611,005 B2 * | 11/2009 | Uenohara | 192/70.252 |
| 8,292,055 B2 * | 10/2012 | Wilton et al. | 192/70.252 X |
| 2010/0133057 A1 * | 6/2010 | Barnholt | 192/70.252 |

* cited by examiner

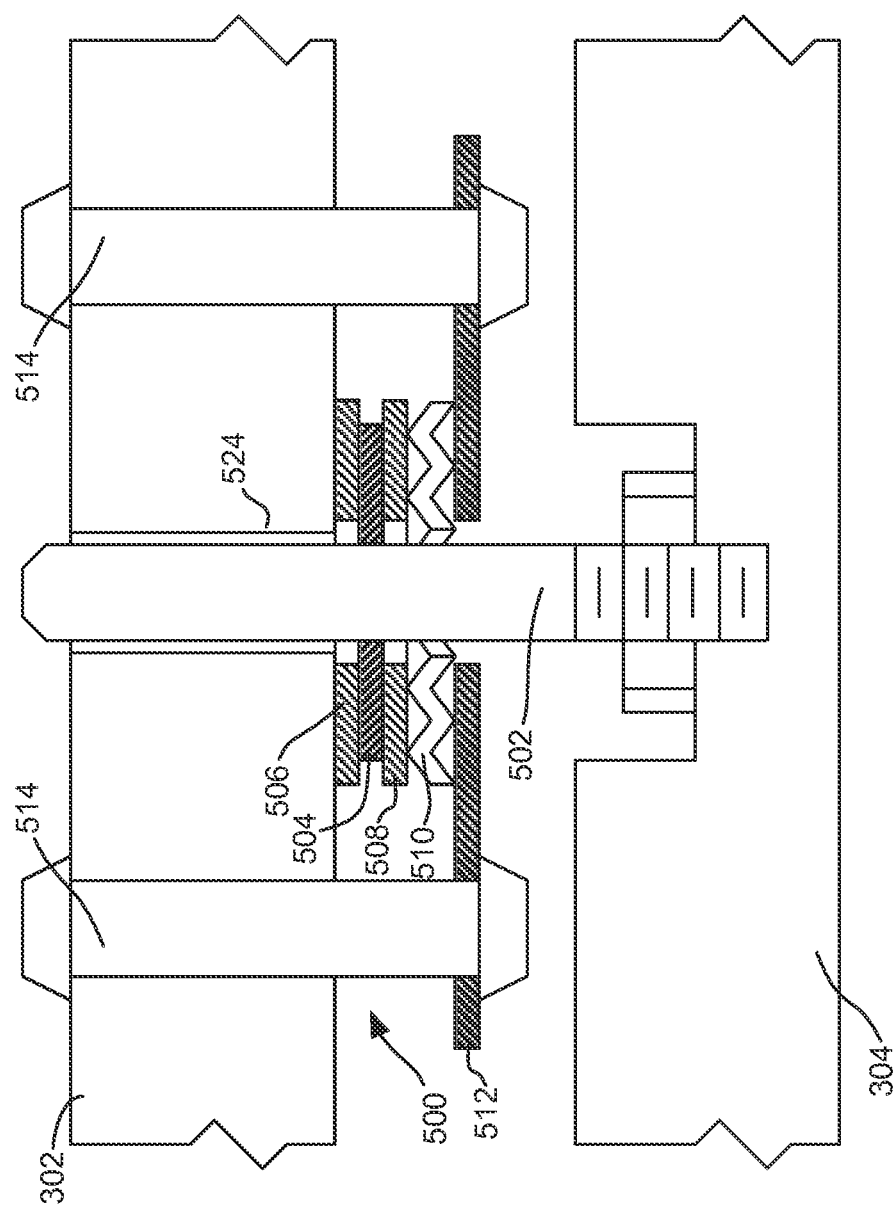

FRICTION CLUTCH SYSTEM

PRIORITY CLAIM

This application is a continuation-in-part of U.S. Pat. No. 8,978,857 issued on Mar. 17, 2015, which is a continuation-in-part of U.S. Pat. No. 8,430,222 issued on Apr. 30, 2013, which claims the benefit of the filing date of U.S. Provisional Patent Application No. 61/257,341 filed on Nov. 2, 2009, both of which are incorporated by reference herein in their entireties.

FIELD OF THE INVENTION

This invention relates generally to a friction clutch system for mechanically coupling a power source to a driven system of a vehicle.

BACKGROUND OF THE INVENTION

As shown in FIG. 1, one conventional type of friction clutch system 10 may be found in an automobile for engaging, disengaging and transmitting torque from the engine 12 (i.e., power source) to a transmission 14 (i.e., driven system). By way of example, the conventional automotive friction clutch system 10 includes a thrust or pressure plate 16 mounted within a clutch housing 18 so that the thrust plate 16 cannot rotate within the housing 18, but can move axially within the clutch housing. The housing 18 is mounted to a counterthrust plate 20. Being weighted, the counterthrust plate is also commonly used as a flywheel as well. The flywheel 20 is mounted to and driven by the power source 12, which may take the form of an internal combustion engine, an electric motor, etc.

The pressure plate 16 may be biased or pressed toward the flywheel 20 by one or more partially compressed Belleville springs, (diaphragms), or coil springs (not shown) and may or may not also employ centrifugal clamping force assist (in the form of bob weights, not shown) all of which can be mounted within the housing 18. The assembled combination of the clutch housing 18, the pressure plate 16, and the diaphragm/spring is generally referred to as a pressure plate assembly 22 within the automotive industry.

A friction disc assembly 24 is located between the flywheel 20 and the pressure plate assembly 22. The friction disc assembly 24 includes, in the illustrated example, a floater disc 26 sandwiched between two friction discs 28. The friction discs 28 include friction facings or linings 30, a carrier plate 32 and a splined hub 34. The friction facings 30 bonded or otherwise, are mechanically connected to the carrier plate 32. The carrier plates 32 are coupled by the splined hub 34, which takes the form of an internally splined hub, to an externally splined shaft 36 of the driven member 14.

In FIG. 2, the like components retain the same reference numerals, but the friction clutch system 10 includes a different friction disc assembly 40. As illustrated, the friction disc assembly 40 includes a floater disc 42 sandwiched between two friction discs 44, both having multiple, radially located damper springs 46 for the purpose of smoothing clutch engagement and isolating engine vibrations from the transmission 14 and driveline (not shown). The damper springs 46 are positioned in a sprung hub assembly 48 that extends axially.

For greater torque capacity and improved heat dissipation, a friction clutch system may incorporate multiple friction discs mounted between the pressure plate assembly and the flywheel. For multi-plate clutch designs, the floater or floater plate may be mounted to and driven by the flywheel, with a floater being located between adjacent pair of friction discs. The pressure plate assembly, flywheel and floater also serve as friction surfaces for the friction discs. Because each friction disc assembly typically has two friction surfaces, a two-disc clutch will have four friction surfaces, a three disc clutch will have six friction surfaces, and so on.

The torque capacity of a friction clutch system is defined as the maximum amount of torque that can be transferred through the system while in its fully engaged state. Once the clutch torque capacity has been exceeded, torque can be lost through the unintentional slipping effect caused between the friction surfaces of the friction clutch system components.

The conventional clutch system of FIG. 1 includes two solid hubs, each with internal splines for engaging the shaft of the transmission, but without any damper springs to reduce the spatial envelop and provide a low rotating weight. However, the lack of damper springs to smooth clutch engagement and isolate engine vibrations can, at least eventually, have a detrimental effect on driveline components. In addition, clutch performance and drive-ability of the vehicle may be diminished.

The conventional, multiple disc clutch system of FIG. 2 with the two sprung hub assemblies, both internally splined for engaging the shaft of the transmission may help with isolating engine vibrations, but require a greater spatial envelope and increase the rotating weight of the system. Current space constraints in various vehicles would not provide room for such an arrangement. Consequently, both conventional systems may be undesirable for use as a high-performance clutch system

SUMMARY OF THE INVENTION

A friction clutch system mechanically couples a power source to a driven system of a vehicle while providing torsional damping within the system. In one embodiment, a friction clutch system includes a flywheel defining an axis of rotation. A locator pin extends outwardly from the flywheel parallel to the axis of rotation and offset therefrom. A damper assembly is secured to a floater and slidably engages the locator pin. The damper assembly is configured to dampen relative movement between the locator pin and the floater.

In some embodiments, the friction clutch system includes a drive pin secured to the flywheel and extending outwardly from the flywheel parallel to the axis of rotation and offset therefrom. The floater may define a drive pin receiver slidably engaging the drive pin.

In some embodiments, the locator pin is a one of a plurality of locator pins distributed uniformly about the axis of rotation. Likewise, the damper assembly is one of a plurality of damper assemblies, each damper assembly engaging a locator pin of the plurality of locator pins.

In some embodiments, the damper assembly includes a bearing member slidably engaging the locator pin and a bearing receiver configured to slidably engage the bearing member effective to dampen vibration of the bearing member relative to the bearing receiver. In some embodiments, the bearing member defines a bearing aperture having the locator pin inserted therethrough, the bearing aperture being sized to prevent circumferential and radial movement of the locator pin relative to the bearing member.

In some embodiments, the bearing receiver includes an upper plate defining an upper aperture and a lower plate defining a lower aperture, the locator pin being inserted through the upper and lower apertures and the bearing member being positioned between the upper and lower plates. The upper and lower apertures may be larger than the bearing aperture.

In some embodiments, a retention plate is secured to the floater having the upper and lower plates and bearing member captured between the retention plate and the floater. The retention member may define a retention aperture having the locator pin inserted therethrough. The retention aperture may also be larger than the bearing aperture. In some embodiments, a biasing member positioned between the retention member and the lower plate, the biasing member urging the lower plate against the bearing member.

In some embodiments, a drive pin is secured to the flywheel and extends outwardly from the flywheel parallel to the axis of rotation and offset therefrom. The floater may define a drive pin receiver slidably engaging the drive pin. In some embodiments, the drive pin receiver permits a first amount of angular movement of the drive pin about the axis of rotation within the drive pin receiver and the bearing aperture permits a second amount of angular movement of the locator pin about the axis of rotation within the bearing aperture, the second amount being less than the first amount. For example, the second amount may be less than 1 percent of the first amount.

In some embodiments, the upper aperture, lower aperture, and retention aperture each permit at least a third amount of angular motion of the locator pin therein about the axis of rotation. The third amount may be greater than or equal to the first amount.

BRIEF DESCRIPTION OF THE DRAWINGS

Preferred and alternative embodiments of the present invention are described in detail below with reference to the following drawings.

FIG. 12 is a partial cross-sectional view of an alternative configuration of the damping system of FIG. 10.

DETAILED DESCRIPTION OF THE PREFERRED EMBODIMENTS

The present invention generally relates, but is not limited, to friction clutch system for mechanically coupling a power source to a driven system of a vehicle. In at least one embodiment, the present invention combines a spring-damped, splined hub with one or more secondary friction discs. The hub includes axially extending protuberances that engage radial slots located in the secondary friction disc. Advantageously, the friction clutch system described herein may allow for torsional vibration damping while reducing the rotational mass of the system. Further, the friction clutch system may provide a more compact and simplified installation.

Figure 3A:
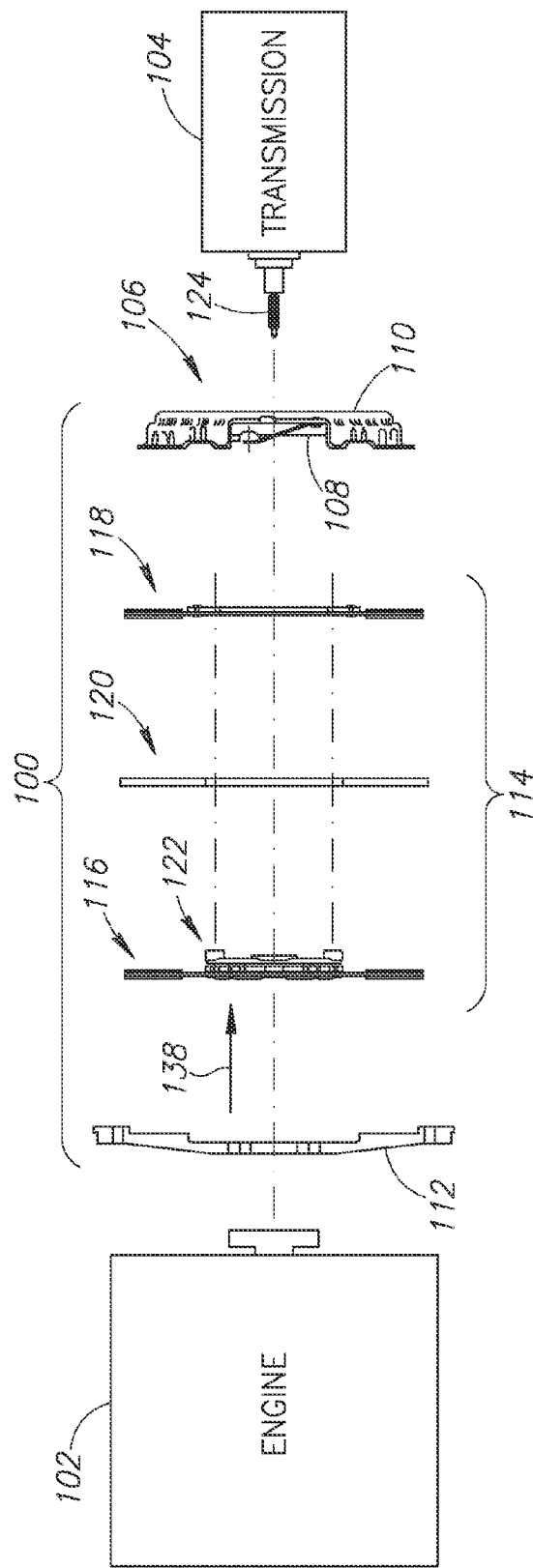
FIG. 3A is an exploded, schematic view of a friction clutch system having a first friction disc assembly with protuberances to directly engage a second friction disc assembly according to an embodiment of the present invention.

FIG. 3A shows an exploded, schematic view of a friction clutch system 100 for engaging, disengaging and transmitting torque from a power source 102 (e.g., engine) to a driven member 104 (e.g., transmission). Similar to the conventional friction clutch systems described above, the illustrated friction clutch system 100 includes a pressure plate assembly 106 comprising a pressure plate 108 mounted within a clutch housing 110, which in turn is mounted to a counterthrust plate or flywheel 112.

In the illustrated embodiment, the pressure plate assembly 106 includes a spring or springs that provide the primary engagement force to a friction disc assembly 114, which may include multiple (two or more) friction discs 116, 118 with a floater plate 120 located therebetween. The floater plate 120 may take the form of the floater plates previously described.

Figure 1:
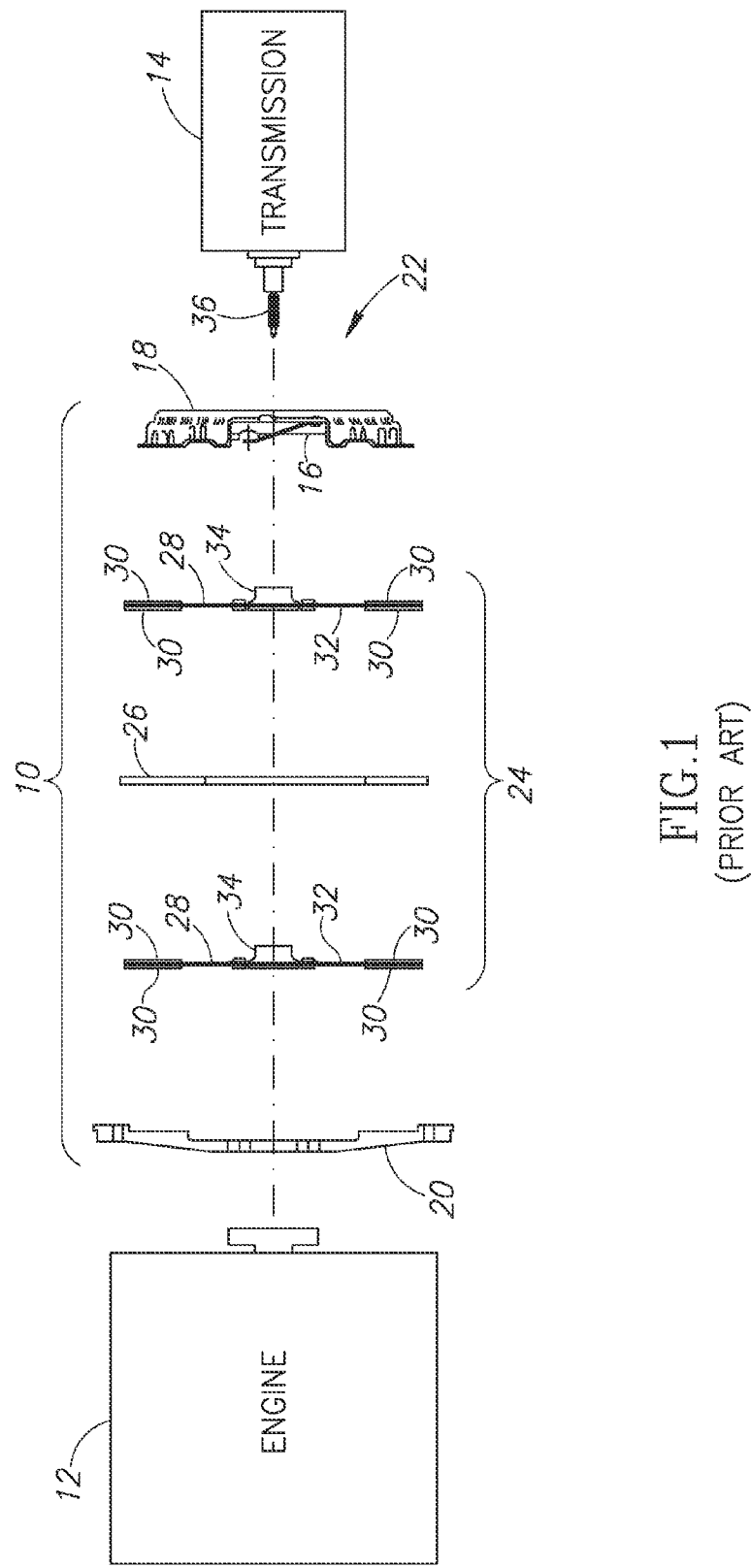
FIG. 1 is an exploded, schematic view of a prior-art friction clutch system having friction disc assemblies each with solid hubs coupled to a splined shaft of a driven member.
Figure 2:
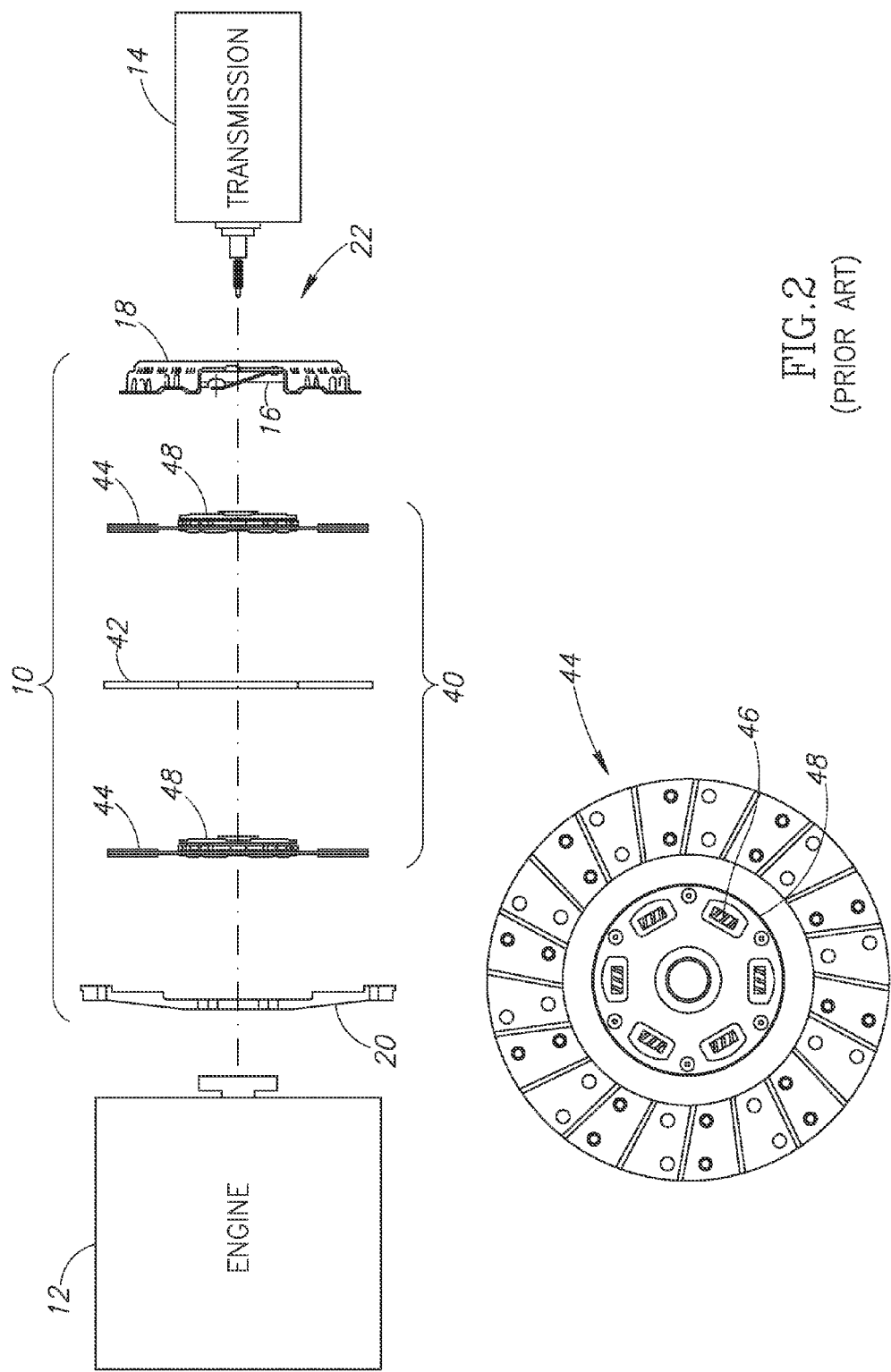
FIG. 2 is an exploded, schematic view of a prior-art friction clutch system having friction disc assemblies each with damping springs located in hubs coupled to a splined shaft of a driven member.

Of the two illustrated friction discs 116, 118, only first disc 116 includes a hub assembly 122 mounted to a driven shaft 124. The second disc 118 does not have a hub assembly (e.g., sprung hub) and is not mounted to the driven shaft 124, but instead engages the first disc 116 as will be described in detail below. Such a configuration may advantageously provide a lighter weight system having a lower rotational inertia while also being more spatially compact than previous systems in which each friction disc included its own hub assembly independently splined to the driven shaft. The space requirements are reduced due to having fewer sprung splined hub assemblies than friction discs. One of the drawbacks of the conventional assembly shown in FIG. 2 was that the amount of space required to have a sprung hub on each friction disc exceeded the allowable design spatial envelope between the pressure plate assembly and flywheel. Thus, to fit such an assembly the springs in the hub assembly would have to be made quite small, making them more difficult to install, harder to retain and less robust in view of the spring forces needed. Another possible advantage of the friction clutch system 100 is that it may replace stock clutch systems within the space envelope provided for the stock clutch system.

Figure 3B:
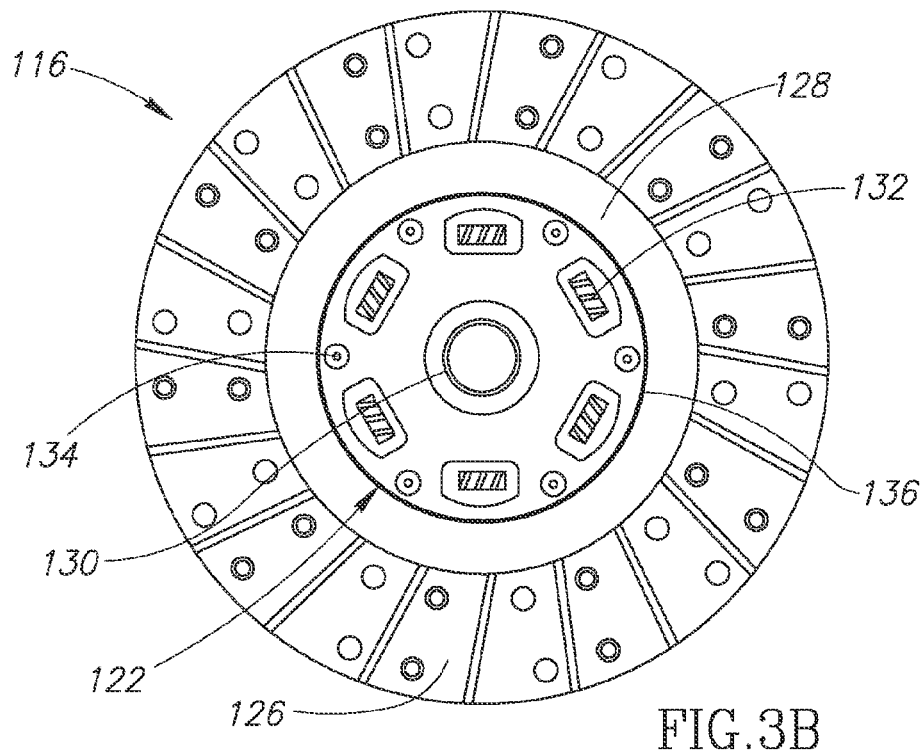
FIG. 3B is schematic, side elevational view of the first friction disc of FIG. 3A with protuberances according to an embodiment of the present invention.
Figure 3C:
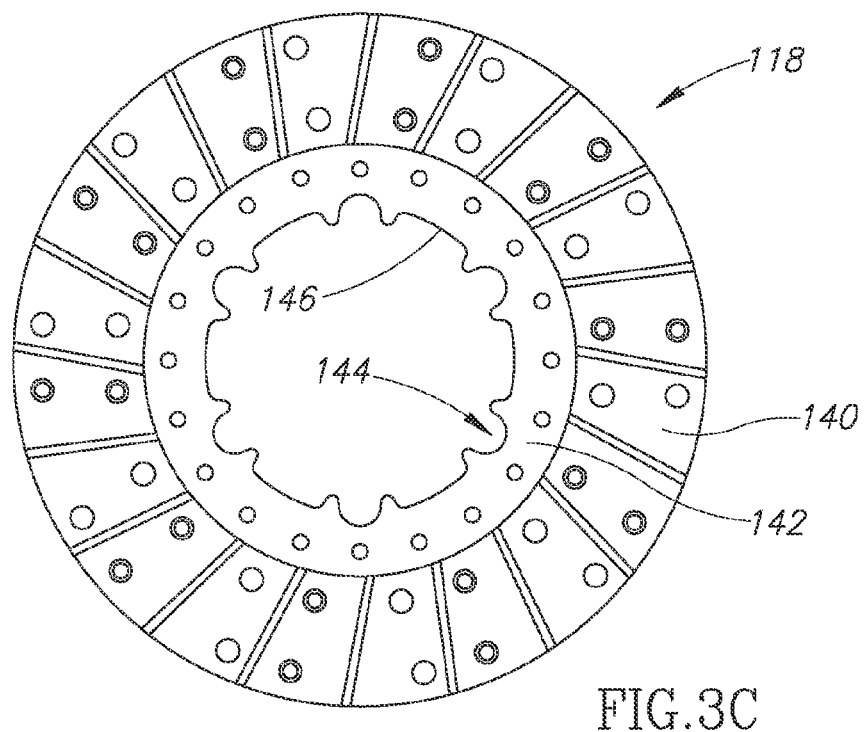
FIG. 3C is schematic, side elevational view of the second friction disc of FIG. 3A with openings according to an embodiment of the present invention.
Figure 4:
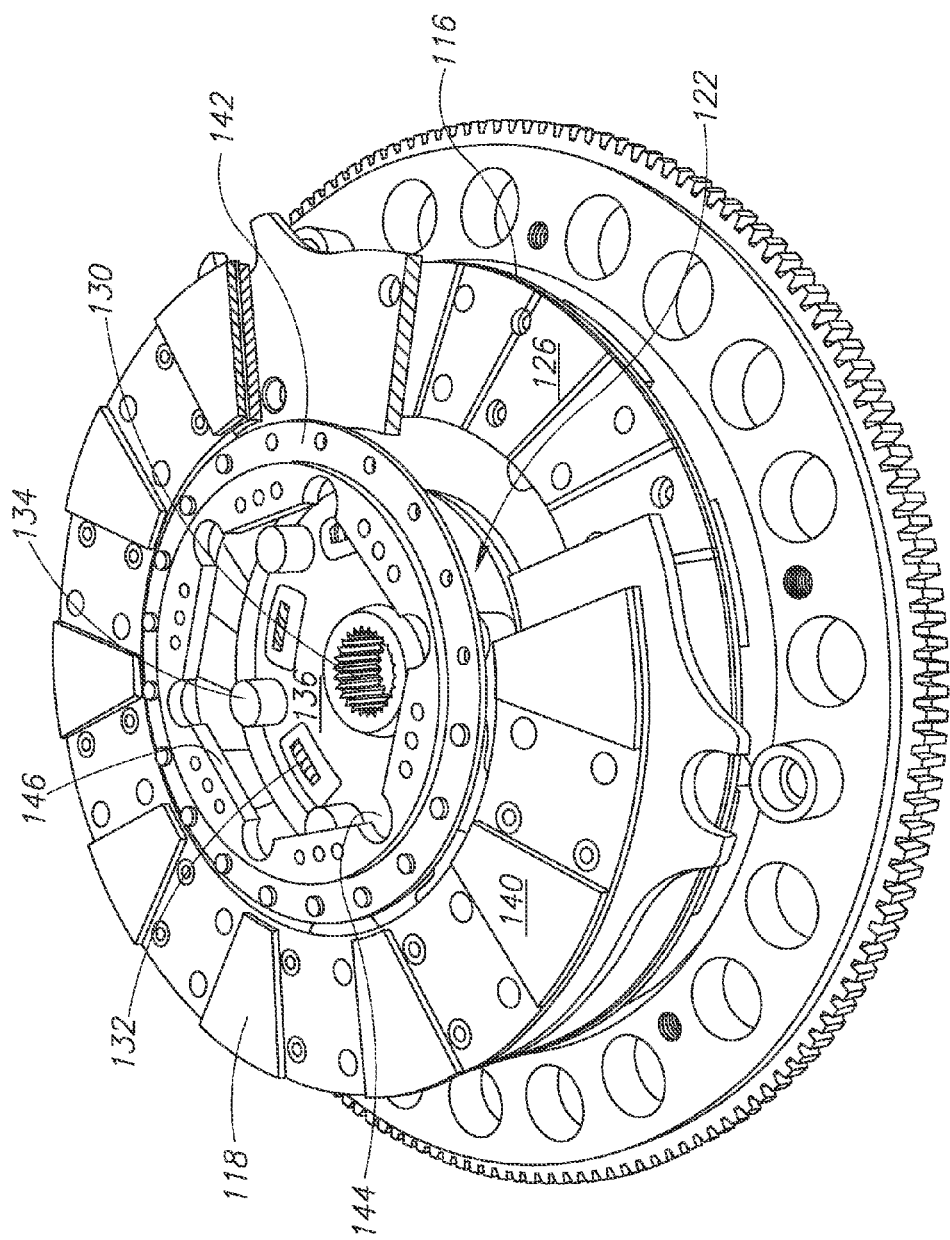
FIG. 4 is a perspective, exploded, partially cut-away view of a friction clutch system having a first friction disc assembly with protuberances to directly engage a second friction disc assembly according to an embodiment of the present invention.

Referring now to FIGS. 3 and 4, the first disc 116 includes the hub assembly 122 and friction facing and/or a plurality of friction pads 126 mounted circumferentially onto a disc body 128. The hub assembly 122 includes an internal splined portion 130, a plurality of damping springs 132, and a plurality of protuberances 134 extending from a hub assembly cover 136. The damping springs 132 may take the form of torsional damping springs. The protuberances 134 may take the form of pins or dowels, which may be cylindrical or have another type of cross-sectional shape. The protuberances 134 extend in an axial direction as indicated by arrow 138 (FIG. 3A).

The second disc 118 includes a friction facing and/or a plurality of friction pads 140 coupled to a central member 142. A plurality of openings 144 are machined or otherwise formed into the central member 142. The openings 144 may take the form of radial slots or notches extending from an inner edge 146 of the central member 142. In addition, the openings 144 are configured to receivably and directly engage the protuberances 134 of the first disc 116. This engagement prevents the discs 116, 118 from rotating relative to one another, but will permit independent axial movement of the secondary friction disc(s) within the given design range. As best seen in FIG. 4, the openings 144 preferably have a shape that complementarily corresponds to the cross-sectional shape of the protuberances 134. For example, if the protuberances 134 are cylindrical then the openings will be circular as well. Alternatively radial slots could receive protuberances of various configurations. Further the openings 144 are sized and aligned to accurately receive the protuberances 134.

Figure 5:
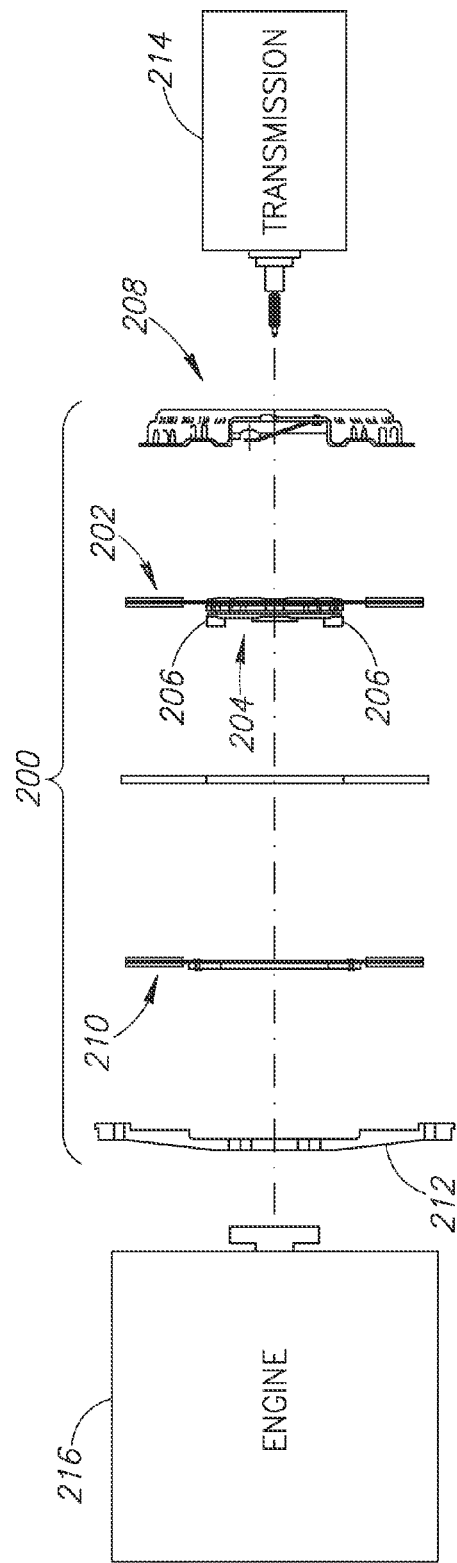
FIG. 5 is a an exploded, schematic view of a friction clutch system having a first friction disc assembly positioned adjacent to a driven member (e.g., pressure plate assembly) and a second friction disc assembly positioned adjacent to a power source (e.g., flywheel) according to another embodiment of the present invention.

FIG. 5 shows a friction clutch system 200 in which a first disc 202 with a hub assembly 204 and protuberances 206 is positioned adjacent to a pressure plate assembly 208. A second disc 210 with openings (not shown) to receive the protuberances 206 is positioned adjacent to a flywheel 212. In comparing FIG. 5 to FIG. 3, the locations of the first and second discs have been switched. Consequently, the first disc 202 may be on the driven side proximate the driven member 214 (e.g., transmission) while the second disc 210 may be on the driving or power side proximate the power source 216 (e.g., engine).

Figure 6A:
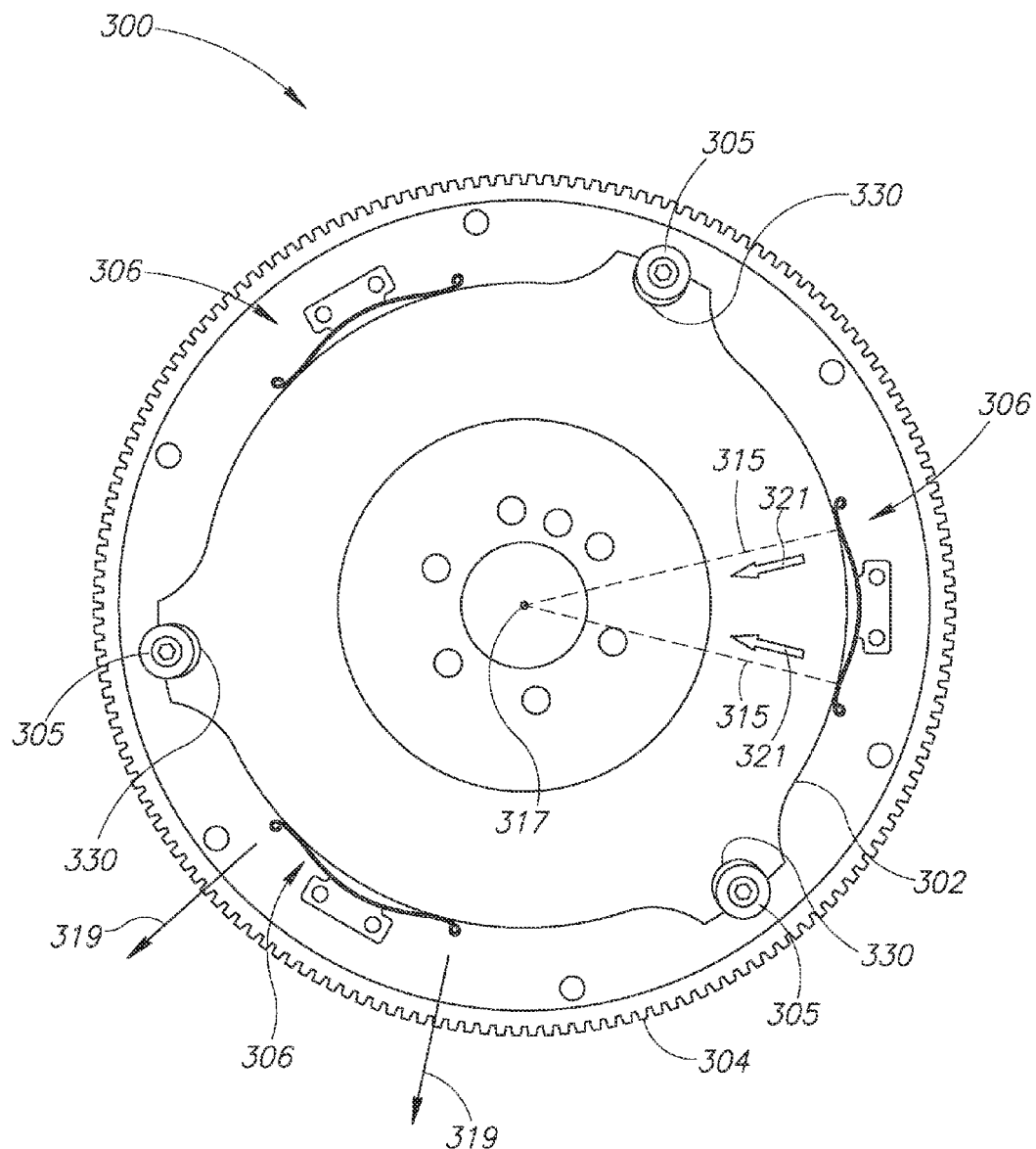
FIG. 6A is a top, plan view of a friction clutch system having a floater resiliently coupled to a flywheel with a plurality of resilient coupling assemblies according to an embodiment of the present invention.
Figure 6B:
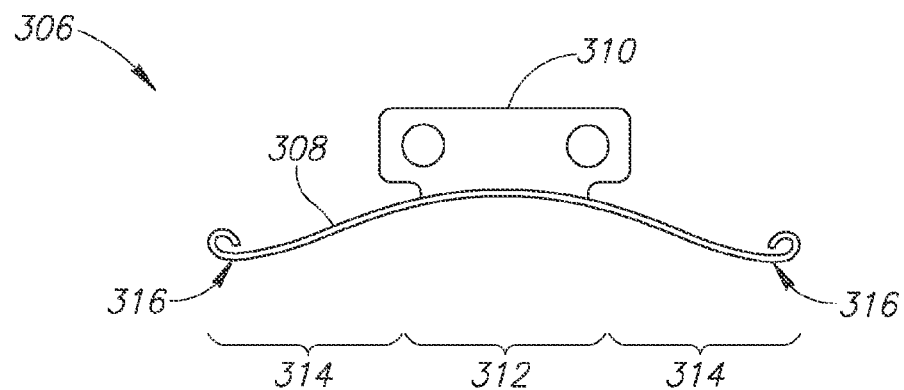
FIG. 6B is a top, plan view of one of the resilient a spring portion and clip portion from one of the resilient coupling assemblies of FIG. 6A.

FIGS. 6A and 6B show a friction clutch system 300 with a floater 302 resiliently coupled to a flywheel 304 by means of pins 305 or lugs attached to the flywheel 304. This engagement between the flywheel 304 and the floater 302 prevents independent rotation relative to one another, but will allow independent axial movement of the floater plate 302 relative to the flywheel 304 In the illustrated embodiment, the resilient coupling is achieved with a resilient coupling assembly 306, which as best shown in FIG. 6B takes the form of a leaf spring 308 fixed to a clip 310. The leaf spring 308 may include a central arcuate portion 312 fixed to the clip 310. Symmetric arms 314 extend respectively from the central arcuate portion 312. Both arms 314 include a contact surface 316 for contacting the floater 302 along a radial line of action 315 relative to a center point 317 of the floater 302. However, the resilient coupling assembly 306 may take other forms such as a compression spring or a spring-loaded detent. The free ends of these springs or detents 308 may be weighted or manufactured in a manner that will allow a centrifugal force, generally directed radially outward as shown by arrow 319, to overcome or negate the spring force, generally directed radially inward as shown by directional arrow 321, acting upon the floater 302. This design allows for quiet clutch operation at low engine revolutions per minute (RPM) while improving high RPM gear changes.

Figure 6C:
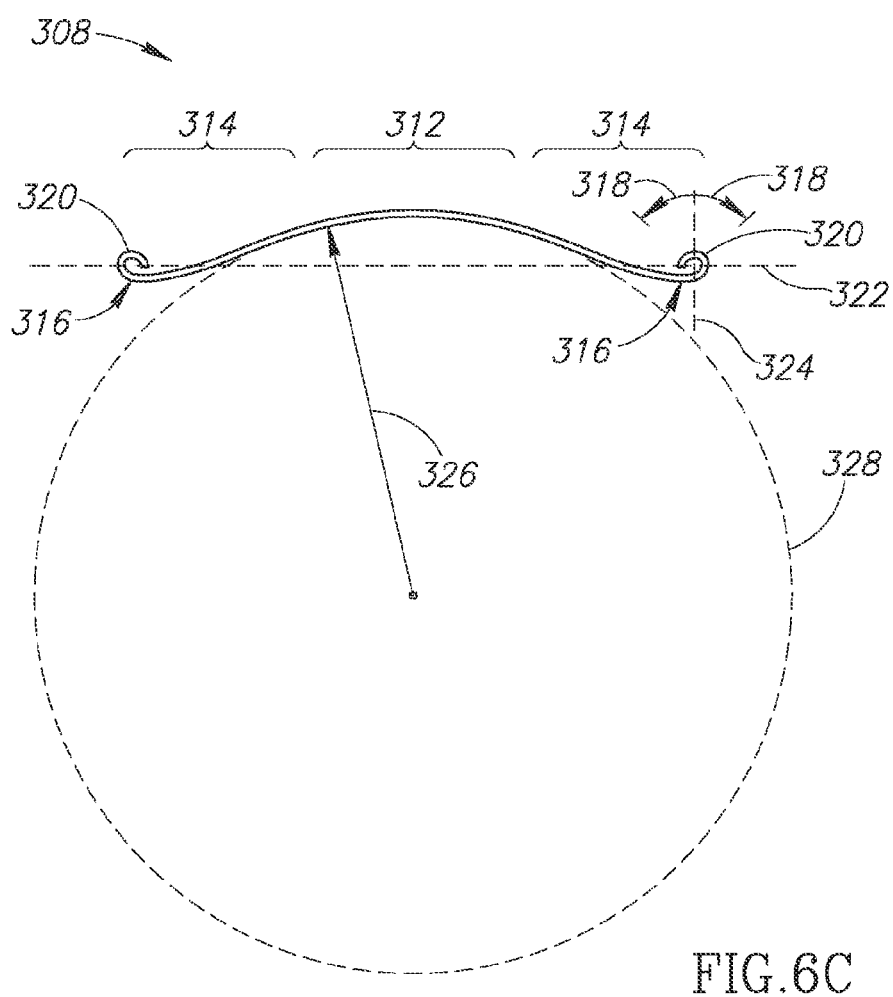
FIG. 6C is a top, plan view of a spring portion from one of the resilient coupling assemblies of FIG. 6A.

FIG. 6C shows the leaf spring 308 with a number of reference dimensions to generally indicate that the leaf spring 308 may be designed for a variety of situations to provide a stiffer or softer spring rate. By way of example, a shackle angle 318 that determines the angle of the eyes 320 relative to a datum line 322 may be varied to increase or decrease spring rate. A vertical line 324 indicates a ninety-degree (90°) shackle angle. In addition, a radius 326 of the central arcuate portion 312 may be modified to change the spring rate of the leaf spring 308. In the illustrated embodiment, the radius defines a reference circle 328. However, it is appreciated that the central arcuate portion 312 may be non-circular, for example parabolic or have some other complex curvature.

Referring back to FIG. 6A, the friction clutch system 300 includes three resilient coupling assemblies 306, which corresponds to six contact locations because each assembly 306 includes two arms 314 (FIG. 6B). However, it is appreciated that a fewer or greater number of resilient coupling assemblies 306 may be employed depending on the size, loading, and other aspects of the friction clutch system 300. The resilient coupling assemblies 306 preferably in combination with drive pin receivers 330, e.g. gaps 330, permit the floater 302 to operate relative to the flywheel 304 while minimizing, if not eliminating, audible sounds that would ordinarily come from the floater 302 vibrating or "rattling" relative to the flywheel 304.

Figure 7:
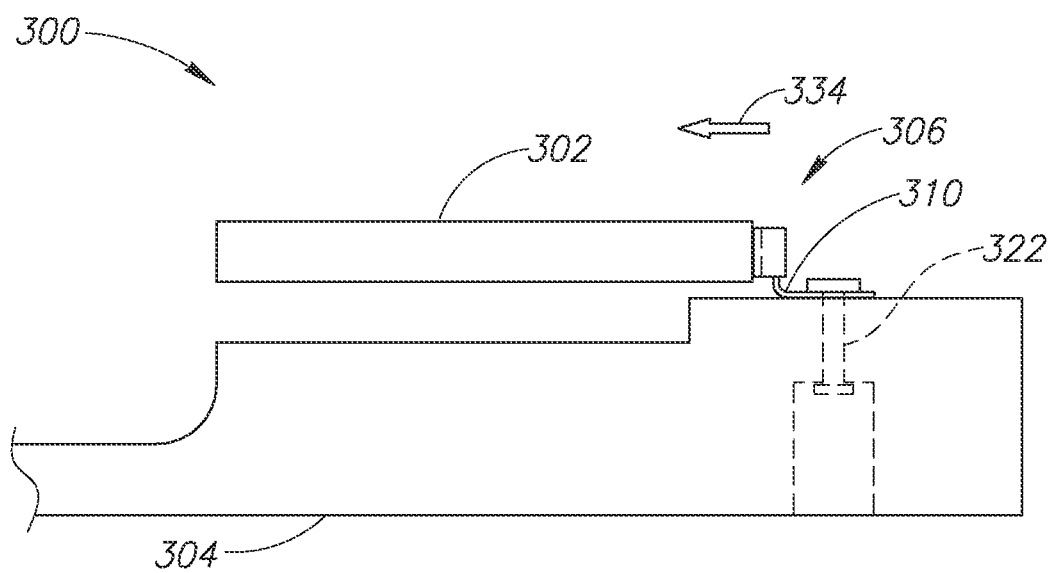
FIG. 7 is a schematic side view of the friction clutch system of FIG. 6A.

FIG. 7 schematically shows the floater 302 coupled to the flywheel 304 using the resilient coupling assembly 306. The clip 310 takes the form of a bent metal clip mechanically attached to the flywheel 304 with a fastener 322. The spring force of the clip 310 is generally directed as indicated by arrow 334.

Figure 8A:
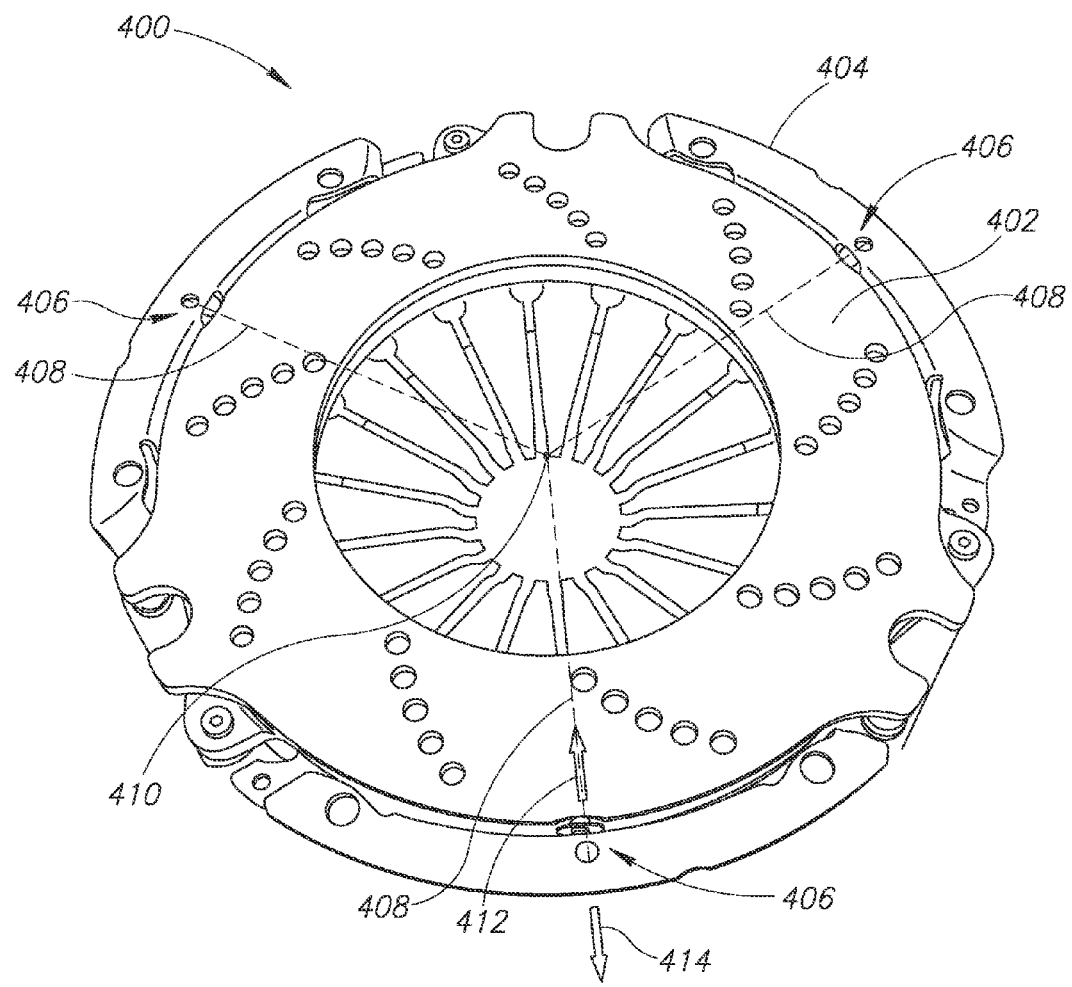
FIGS. 8A, 8C and 9 are perspective views of a friction clutch system having spring-loaded members mounted to the clutch pressure plate according to another embodiment of the present invention.
Figure 8B:
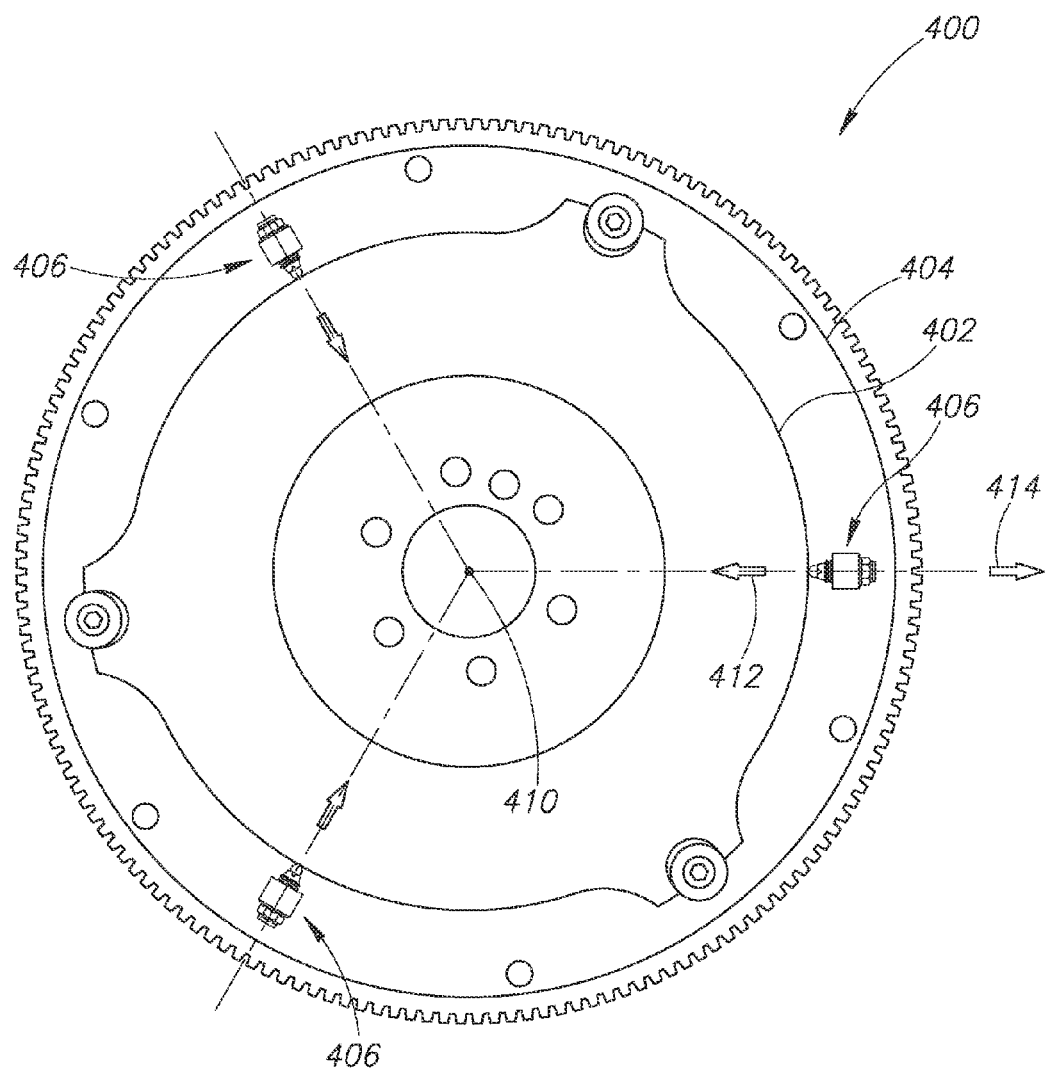
FIGS. 8B, 8D, 8E, 8F and 8G are perspective views of a friction clutch system having spring-loaded detent members mounted to the flywheel according to another embodiment of the present invention.
Figure 8C:
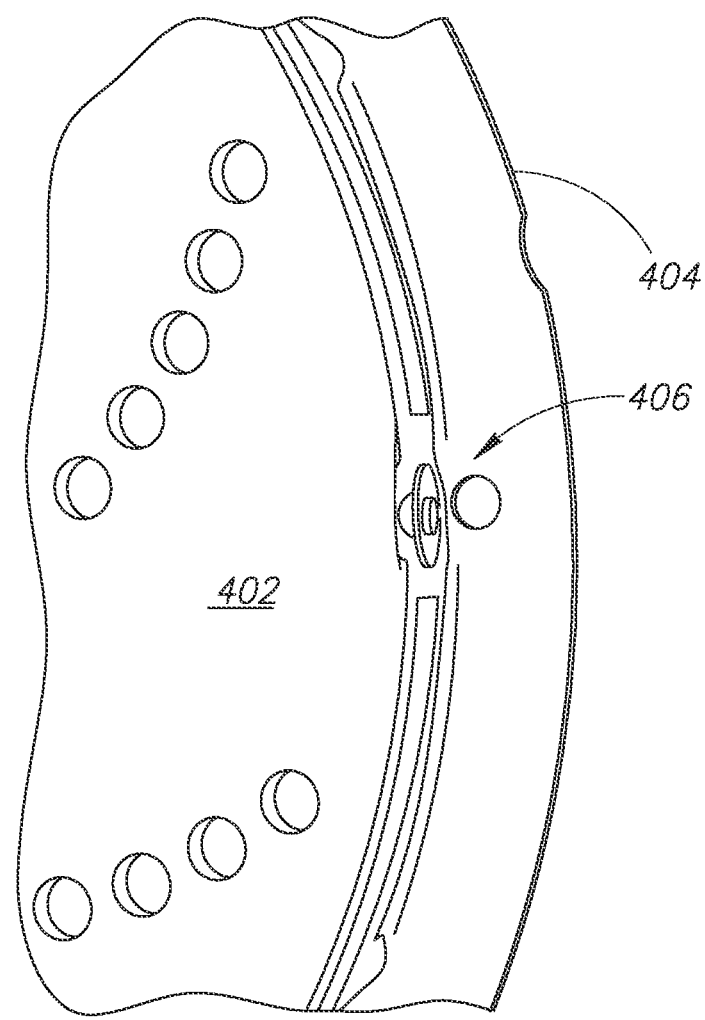
Figure 9:
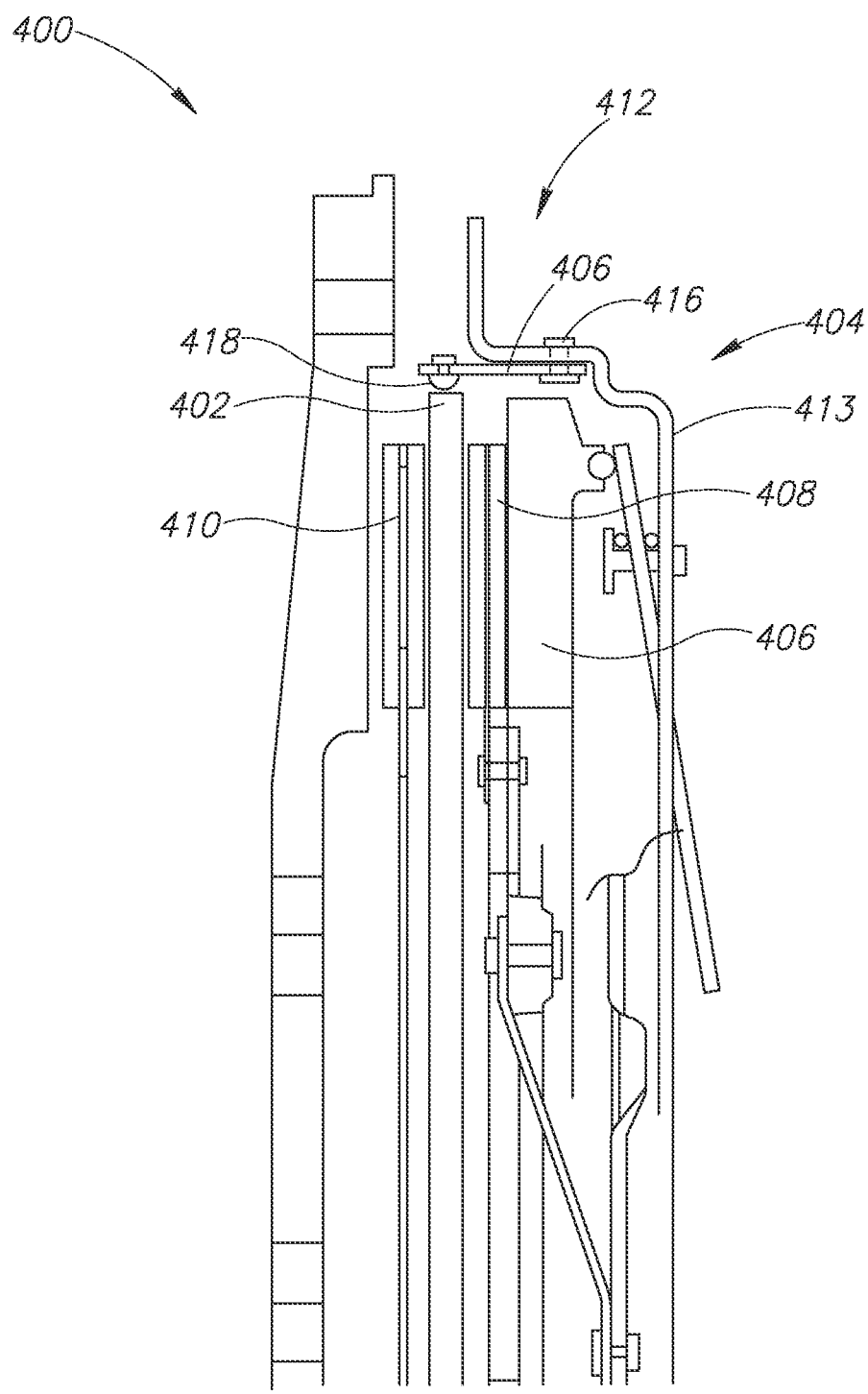

FIGS. 8A, 8C and 9 show another embodiment of a friction clutch system 400 having a floater 402 resiliently coupled to a pressure plate assembly 404 with a resilient coupling assembly 406. In the illustrated embodiment, the assembly 406 takes the form of a spring-loaded mechanism that is compression loaded between the floater 402 and the pressure plate assembly 404. The spring-loaded mechanism 406 is oriented along a radial line of action 408 extending from a central point 410 of the floater 402 or pressure plate 404 toward the spring-loaded mechanism 406. Alternatively stated, the spring-loaded mechanism 406 is attached to the pressure plate 404 and oriented to absorb kinetic energy from the floater 402 in a radial direction 408, and in which a spring force of the mechanism 406 is directed radially inward as indicated by arrow 412 to react a centrifugal force directed radially outward as indicated by arrow 414. In the illustrated embodiment, the assembly 406 takes the form of a semi-spherical member in contact engagement with a pin as best shown in FIG. 8C.

FIGS. 8B and 8D-8F show the friction clutch system 400 with the flywheel 404 engaged with the floater 402 using a detent mechanism 406. In the illustrated embodiment, the detent mechanism 406 is adjustably received in a boss or lug 416 coupled to the flywheel 404. The mechanism 406 includes an externally threaded body 418 that permits adjustment relative to the boss 416 and an end cap 420 to secure the mechanism 406 once adequately adjusted.

Figure 8D:
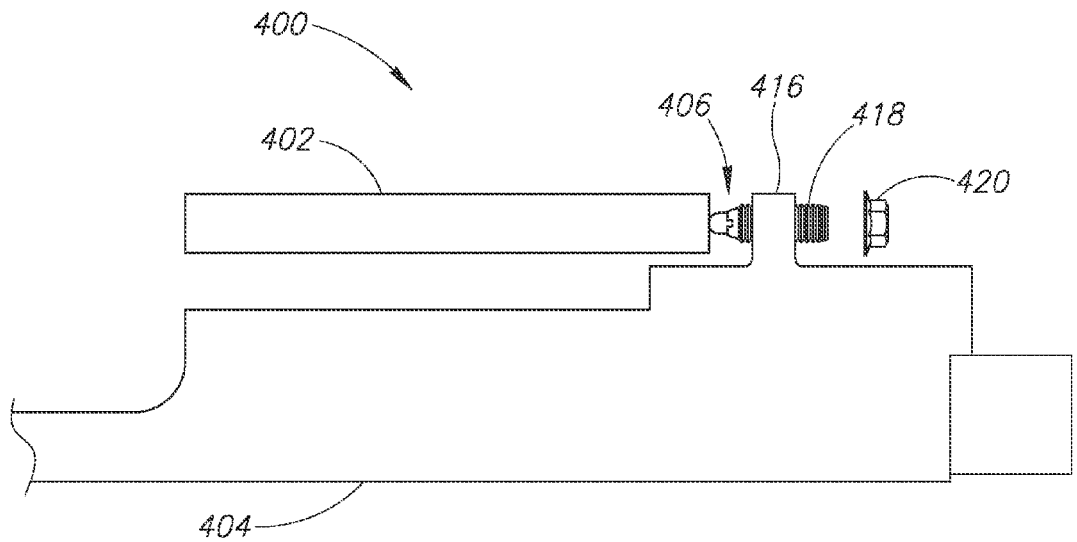
Figure 8E:
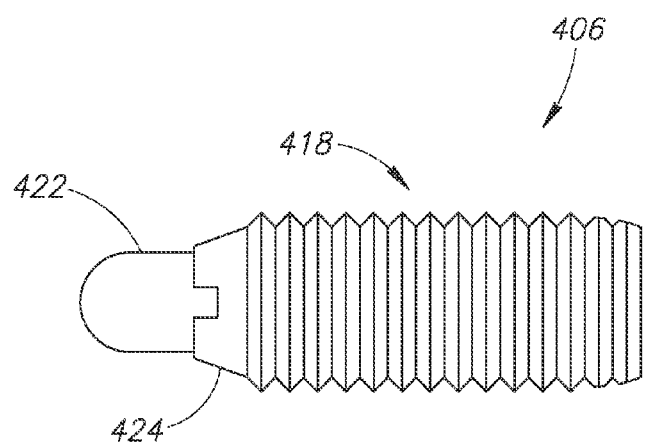
Figure 8F:
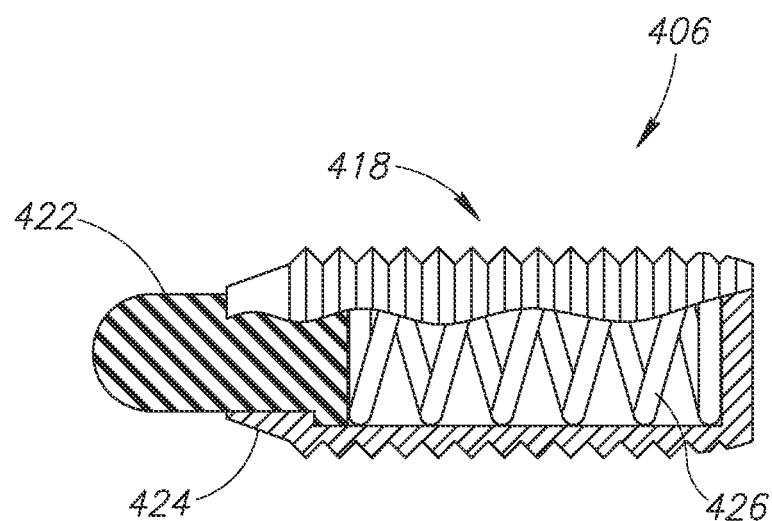
Figure 8G:
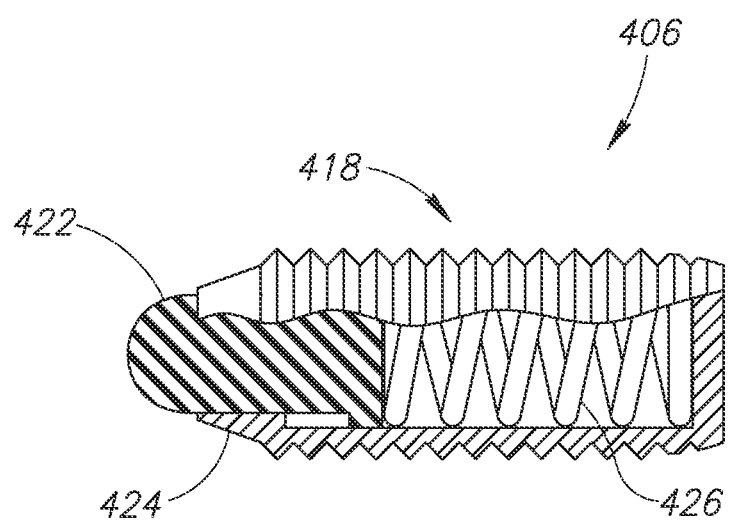

Referring specifically to FIGS. 8E-8G, the detent mechanism 406 includes the threaded body 418 coupled to a detent plunger 422. A collar 424 may be coupled to an end portion of the threaded body 418 to provide a tapered transition from the threaded body 418 to the detent plunger 422.

Referring specifically to FIGS. 8F and 8G, the mechanism 406 includes a biasing member 426 located within the threaded body 418. The biasing member 426 may take the form of a coil or compression spring having one end portion seated against a back wall of the threaded body 418 and an opposite end portion seated against the plunger 422. FIG. 8F shows the biasing member 426 in an extended position such that a tip of the plunger 422 has been moved away from the threaded body 418; whereas FIG. 8G shows the biasing member in a compressed position.

In the illustrated embodiments, the resilient coupling between the flywheel 404 and the floater 402 is achieved with a detent spring-loaded mechanism 406. FIGS. 8B and 8D best show the detent spring-loaded mechanism 406 is mounted to the flywheel 404 by threaded means within machined or otherwise permanently attached mounting lugs 416.

FIGS. 8E, 8F and 8G best shows the body of the detent spring-loaded mechanism 424 contains external threads 418 in which directly engage the internal threads (not shown) contained within the flywheel mounting lug 416 and allows for threaded lock nut 420 to prevent unintended movement of the detent mechanism 406 in relationship to the mounting lug 416. As best shown in FIGS. 8F and 8G the spring-loaded detent pin 422 is allowed liner movement within the mechanism body 424 by compressing detent spring 426.

FIG. 8F is a cut-a-way view that shows the detent spring 426 fully extended within the detent body 424. FIG. 8G is a cut-a-way view that shows the detent spring 426 partially compressed within the detent body 424. By means of the external body threads 418 (FIG. 8E) and internal threads (not shown) contained within the flywheel detent mounting lugs 416 allows for varying the amount of spring compression thus allowing easy spring force adjustment during manufacture and/or by the end user for individual application optimization. Referring back to FIG. 8B, the detent pins 422 (shown in FIGS. 8E, 8F and 8G) can be weighted or manufactured in a manner such that will allow centrifugal force, generally directed outward as shown by arrow 414, to overcome or negate the spring force as applied by detent spring 426 (shown in FIGS. 8F and 8G), force applied generally directed as shown by directional arrow 412 and acting directly upon the floater 402. This design also allows for quiet clutch operation at low engine revolutions per minute (RPM) while improving high RPM gear changes.

Figure 10:
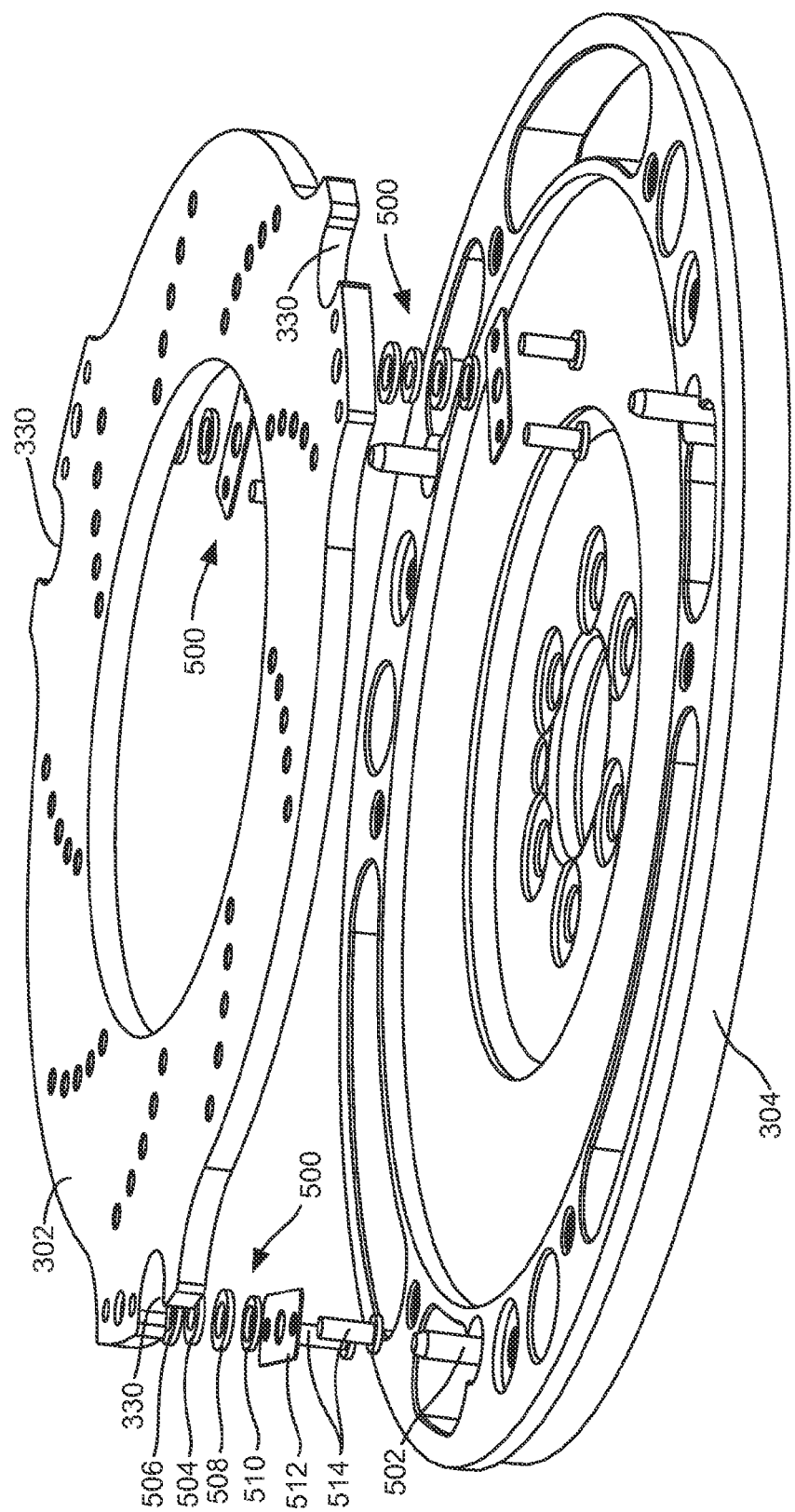
FIG. 10 is an isometric exploded view of a floater plate and flywheel having a damping system in accordance with an embodiment of the present invention.

Referring to FIG. 10, in some embodiments, noise caused by a floater 302 may be reduced by means of damping assemblies 500 coupling the floater 302 to the flywheel 304. The illustrated damping assemblies 500 may be used in combination with some or all of the embodiments of a friction clutch system disclosed hereinabove.

The damping assembly 500 may engage a locator pin 502 secured to the flywheel 304 and extending outwardly therefrom parallel to an axis of rotation of the flywheel 304 and offset therefrom. The locator pins 502 may take the place of the drive pins 305 disclosed herein, but are preferably used in combination with drive pins 305. The damping assembly 500 may include a bearing plate or washer 504 that snugly engages the locator pin 502. The bearing washer 504 may be engaged by a bearing receiver operable to permit movement of the bearing plate 504 in response to vibration of the floater 302 relative to the locator pin as well as damp such movement.

Figure 11:
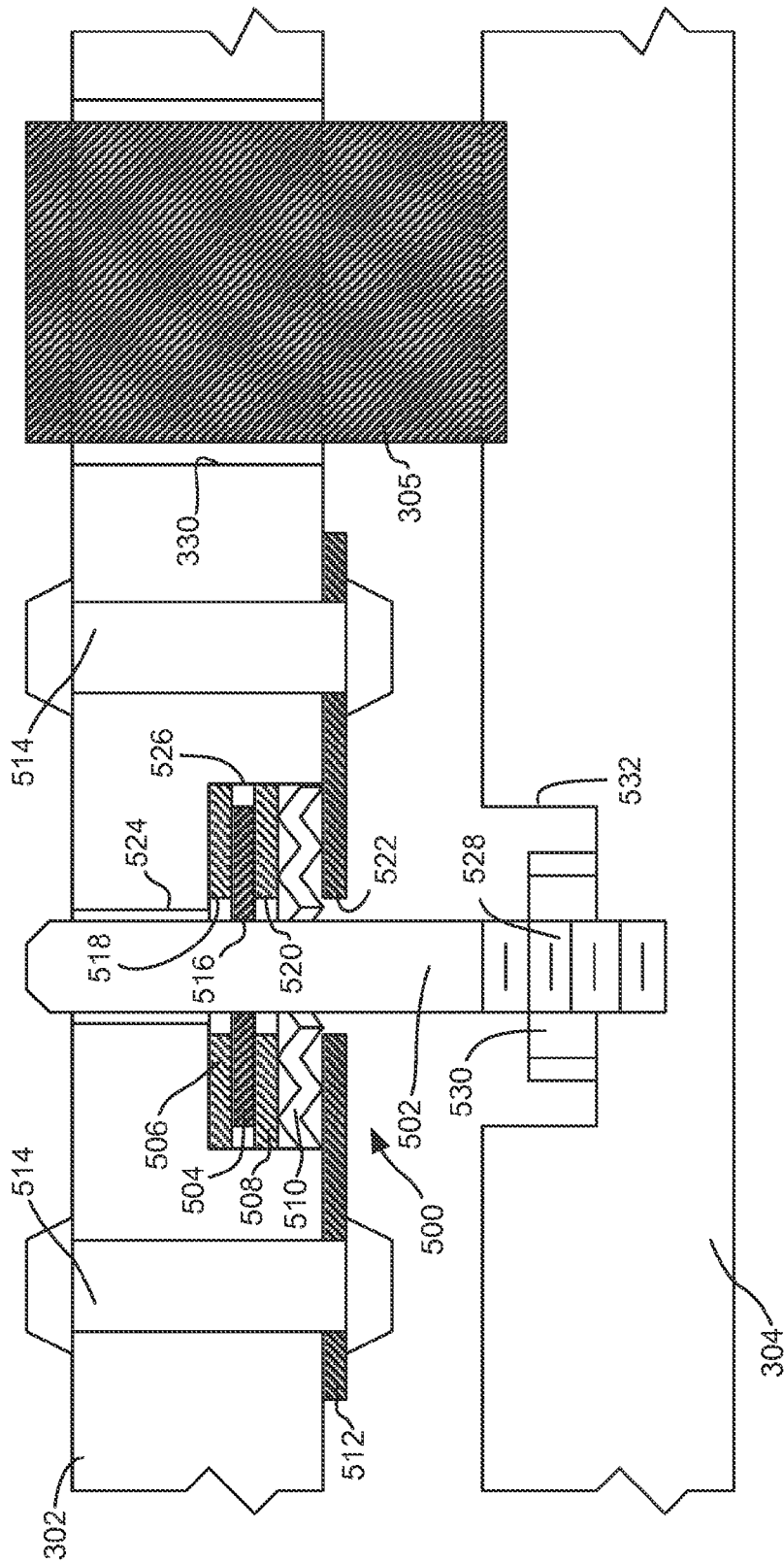
FIG. 11 is a partial cross-sectional view of the damping system of FIG. 10.

In the illustrated embodiment, the bearing receiver is formed by bearing receiver plates including an upper plate 506 and a lower plate 508 positioned above and below the bearing washer. Upper and lower plates 506, 508 preferably take the form of metal washers. A biasing member 510 may engage one or both of the upper plate 506 and lower plate 508 effective to urge one or both of the upper plate 506 and lower plate 508 against the bearing plate 504. The engagement of the upper plate 506 and lower plate 508 with the bearing plate 504 provides friction force that resists movement of the bearing plate 504 thereby damping vibration of the floater 302. FIG. 10 shows that the washer 504 has first and second bearing surfaces embodied as first and second planar surfaces opposite one another. FIG. 11 shows that the bearing washer 504 has the first planar surface engaging the upper plate 506 and the second planar surface engaging the lower plate 508. In the illustrated embodiment, the bearing plate 504, upper plate 506, and lower plate 508 are round washers. However, any shape, including rectangular, may be adequate to implement a bearing assembly 500. The biasing member 510 may be a coil spring, leaf spring, spring washer (such as a wavy washer), a washer formed of a resilient material (e.g., rubber or polymer), or some other resilient member.

In some embodiments, the bearing plate 504 includes a material that is able to bear the sliding motion relative to the upper and lower plates 506, 508 for a large number of cycles without failing. For example, the bearing plate 504 may be formed of, include, or be coated with, a lubricating material such as Oilite™ or some other solid lubricant such as molybdenum disulfide, tungsten disulfide, polytetrafluoroethylene, or like substance. In other embodiments, surfaces of the upper and lower plates 506, 508 engaging the bearing plate 504 additionally or alternatively include a similar solid lubricant or lubricating material.

A retention plate 512 may retain the bearing plate 504, upper plate 506, lower plate 508, and biasing member 510 in engagement with the floater 302. For example, rivets 514 may secure the retention plate 512 to the floater 302 having the bearing plate 504, upper plate 506, lower plate 508, and biasing member 510 captured between the retention plate 512 and the floater 312. In some embodiments, the retention plate 512 may also function as a biasing member urging the upper and lower plates 506, 508 into engagement with the bearing plate 504. For example, the retention plate 512 may be bowed, bent, have a concave shape, or otherwise be configured to provide a biasing force upon being secured to the floater 302.

In some embodiments, the upper plate 506 may be replaced with a portion of the floater 302 engaging the bearing plate 504 and/or the functionality of the lower plate 508 may be provided by the retention plate 512 or biasing member 510 engaging the bearing plate 504 directly. Likewise, the functionality of the biasing member 510 may be replaced by biasing force exerted by the retention plate 512 and the biasing member 510 may be omitted.

Referring to FIG. 11, the bearing plate 504 may define an aperture 516 having the locator pin 502 inserted therethrough. The aperture 516 may have a size, e.g. diameter, that is large enough to permit sliding of the locator pin 502 without significant resistance but small enough to inhibit lateral movement of the locator pin 502 within the aperture 516, e.g. perpendicular to the axis of rotation of the flywheel 304.

The upper plate 506 and lower plate 508 may likewise define apertures 518, 520. The apertures 518, 520 may have sizes, e.g. diameters, that are larger than that of the aperture 516. In this manner, the locator pin 502 is permitted to move within the apertures 518, 520 but not the aperture 516 thereby causing the bearing plate 504 to slide between the upper plate 506 and lower plate 508 in response to vibrations of the locator pin 502.

In the illustrated embodiment, the retention plate 512 defines an aperture 522 through which the locator pin 502 passes. The aperture 522 may likewise be larger, e.g. have a larger diameter, then the aperture 516. In some embodiments, the locator pin 502 also passes partially or completely through the floater 302, which may define an aperture 524 for receiving the locator pin 502. The aperture 524 may have a size, e.g. diameter, that is also larger than the aperture 516 such that the locator pin 502 is able to move within the aperture 524.

In the embodiment of FIG. 11, some or all of the bearing plate 504, upper plate 506, lower plate 508, and biasing member 510 are positioned within a recess 526 defined by the floater. For example, the retention plate 512 may be secured over an opening of the recess securing the bearing plate 504, upper plate 506, lower plate 508, and biasing member 510 within the recess. As noted above, the bearing plate 504 may be permitted to slide between the upper and lower plates 506, 508. Accordingly, the recess 526 may be larger than the bearing plate 504 in at least one dimension to permit movement of the bearing plate 504 in at least that direction. For example, the bearing plate 504 may be a washer with a radius smaller than a radius of the recess 526. A depth of the recess 526, e.g. parallel to the axis of rotation of the floater 302 and flywheel 304, may be such that upon securement of the retention plate 512, the biasing member is not completely compressed, e.g. no longer capable of further compression due to elastic deformation.

As noted above, the flywheel 304 may have one or more drive pins 305 that engage the floater 302 in order to transfer toque from the flywheel 304 to the floater 302. For example, the floater 302 may include drive pin receivers 330 embodied as notches or apertures defined near the perimeter of the floater 302. In some embodiments, a gap exists between the drive pin receiver 330 and the drive pin 305. For example, a first amount of movement, including one or both of angular and radial movement relative to the axis of rotation of the floater 302 and flywheel 304, may be permitted between the drive pins 305 and the receivers 330 absent any other restraints on relative movement of the floater 302 and flywheel 304. In some embodiments, each locator pin 502 may be located adjacent a drive pin 305, e.g. within 30 degrees, preferably 20 degrees, and more preferably within 10 degrees, as measured about the axis of rotation of the floater 302 and flywheel 304.

In some embodiments, a second amount of movement, including one or both of angular and radial movement relative to the axis of rotation of the floater 302 and flywheel, 304 is permitted between the locator pin 502 and the aperture 516 in the bearing plate 504 due to the size of the aperture 516 relative to the locator pin 502 absent other restraints on relative movement. The second amount is preferably smaller than the first amount. In this manner, typical movements of the drive pin 305 relative to the drive pin receiver 330 will be resisted by friction between the bearing plate 504 and the upper and lower plates 506, 508. For example, the second amount may be less than 10%, preferably less than 5%, and more preferably less than 1% of the first amount.

As noted above, the apertures 518, 520 of the upper and lower plates 506, 508, the aperture 522 of the retention plate 512, and the aperture 524 in the floater 524 may all receive the locator pin 502 inserted therethrough. As also noted above, all of these apertures may be larger than the aperture 516 of the bearing plate 504. In some embodiments, it is not desired to load the locator pin 502. Accordingly, each of these apertures may allow at least a third amount of movement, including one or both of angular and radial movement relative to the axis of rotation of the floater 302 and flywheel 304, of the locator pin 502 within the each aperture absent other constraints on relative movement. The third amount may be greater than or equal to the first amount, preferably greater. In this manner, relative movement of the flywheel 304 and floater 302 in response to application of torque will be arrested by engagement of the drive pin 305 with the drive pin receiver 330 rather than by loading the locator pin 502.

Likewise, as noted above, the recess 526 may be larger than the bearing plate 504. For example, a fourth amount of movement, including one or both of angular and radial movement relative to the axis of rotation of the floater 302 and flywheel 304, of the bearing plate 504 within the recess 526 may be permitted absent other constraints on movement of the bearing plate 504 within the recess 526. In this manner, permissible movement of the drive pin 305 within the receiver 330 will not be constrained due to the bearing plate 504 abutting the recess 526.

The locator pin 502 may secure to the flywheel 304 by means of a threaded portion 528. In some embodiments, a nut 530 may also engage the threaded portion 528 in order to ensure that threads engaged with the flywheel 304 are sufficiently tensioned to retain the locator pin 502. Other means of securement are also possible, including welds or other removable and non-removable fastening means. In some embodiments, the locator pin and nut 530 may secure within a recess 532 defined by the flywheel 304 such that the nut 530 does not protrude outside an opening of the recess 532.

Various alternative configurations and mounting schemes may be used to secure the damping assembly 500 to the floater 302. For example, referring to FIG. 12, in some embodiments, the recess 526 may be omitted or sized such that the damping assembly 500 protrudes from a face of the floater 302.

Furthermore, although the locator pin 502 is secured to the flywheel 304 and the damping assembly 500 is secured to the floater 302 in the illustrated embodiment, this configuration can be reversed in some embodiments. Also, although the damping assembly 500 is shown interposed between the floater 302 and the flywheel 304, in some embodiments, the damping assembly 500 may be positioned having the floater 302 positioned between it and the flywheel 304.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A friction clutch system comprising:
   a first member defining an axis of rotation;
   a locator pin extending outwardly from the first member parallel to the axis of rotation and offset therefrom;
   a second member; and
   a damper assembly secured to the second member and slidably engaging the locator pin, the damper assembly configured to simultaneously permit and dampen relative movement between the locator pin and the second member in an axial plane perpendicular to the axis of rotation.

2. The friction clutch system of claim 1, further comprising a drive pin secured to the first member and extending outwardly from the first member parallel to the axis of rotation and offset therefrom, the second member defining a drive pin receiver slidably engaging the drive pin.

3. The friction clutch system of claim 1, wherein the locator pin is a one of a plurality of locator pins distributed uniformly about the axis of rotation; and
wherein the damper assembly is one of a plurality of damper assemblies, each damper assembly engaging a locator pin of the plurality of locator pins.

4. The friction clutch system of claim 1, wherein the damper assembly comprises:
a bearing member slidably engaging the locator pin along the axis of rotation, the bearing member defining first and second planar surfaces facing in opposite directions and parallel to the axial plane; and
a bearing receiver configured to slidably engage the first and second planar surfaces of the bearing member effective to dampen vibration of the bearing member relative to the bearing receiver parallel to the axial plane.

5. The friction clutch assembly of claim 4, wherein the bearing member is an annular member defining a bearing aperture having the locator pin inserted therethrough, the bearing aperture sized to prevent circumferential and radial movement of the locator pin relative to the bearing member.

6. The friction clutch assembly of claim 5, wherein the bearing receiver comprises an upper plate defining an upper aperture and a lower plate defining a lower aperture, the locator pin being inserted through the upper and lower apertures and the bearing member being positioned between the upper and lower plates, the upper and lower apertures being larger than the bearing aperture.

7. The friction clutch assembly of claim 6, wherein the bearing receiver further comprises a retention plate secured to the second member having the upper and lower plates and bearing member captured between the retention plate and the second member, the retention plate defining a retention aperture having the locator pin inserted therethrough, the retention aperture being larger than the bearing aperture.

8. The friction clutch system of claim 7, further comprising a biasing member positioned between the retention member and the lower plate, the biasing member urging the lower plate against the bearing member.

9. The friction clutch system of claim 8, further comprising a drive pin secured to the first member and extending outwardly from the first member parallel to the axis of rotation and offset therefrom, the second member defining a drive pin receiver slidably engaging the drive pin;
wherein the drive pin receiver permits a first amount of movement of the drive pin about the axis of rotation within the drive pin receiver; and
wherein the bearing aperture permits a second amount of movement of the locator pin about the axis of rotation within the bearing aperture, the second amount being less than the first amount.

10. The friction clutch system of claim 9, wherein the second amount is less than 1 percent of the first amount.

11. The friction clutch system of claim 9, wherein the upper aperture, lower aperture, and retention aperture each permit at least a third amount of angular motion of the locator pin therein about the axis of rotation, the third amount being greater than or equal to the first amount.

12. The friction clutch system of claim 1, wherein the first member is a flywheel and the second member is a floater plate.

13. an axis of rotation;
a locator pin extending outwardly from the flywheel parallel to the axis of rotation and offset therefrom;
a floater; and
one or more friction plates positioned facing the floater;
a splined shaft slidably engaging at least one of the one or more friction plates, the splined shaft being coupled to a transmission; and
a damper assembly secured to the floater and slidably engaging the locator pin, the damper assembly configured to simultaneously dampen relative movement between the locator pin and the floater and permit movement of the locator pin in an axial plane perpendicular to the axis of rotation.

14. The friction clutch system of claim 13, further comprising a drive pin secured to the flywheel and extending outwardly from the flywheel parallel to the axis of rotation and offset therefrom, the floater defining a drive pin receiver slidably engaging the drive pin.

15. The friction clutch system of claim 14, wherein the locator pin is a one of a plurality of locator pins distributed uniformly about the axis of rotation;
wherein the drive pin is one of a plurality of drive pins distributed uniformly about the axis of rotation, each locator pin of the plurality of locator pins being located adjacent a drive pin of the plurality of drive pins; and
wherein the damper assembly is one of a plurality of damper assemblies, each damper assembly engaging a locator pin of the plurality of locator pins.

16. The friction clutch system of claim 13, wherein the damper assembly comprises a bearing member slidably engaging the locator pin and a bearing receiver configured to slidably engage the bearing member effective to dampen vibration of the bearing member relative to the bearing receiver.

17. The friction clutch assembly of claim 16, wherein the bearing member is a washer having first and second bearing surfaces that are both planar and opposite one another, the bearing member further defining a bearing aperture extending through the first and second surfaces and having the locator pin inserted therethrough, the bearing aperture sized to prevent circumferential and radial movement of the locator pin relative to the bearing member.

18. The friction clutch assembly of claim 17, wherein the bearing receiver comprises an upper plate defining an upper plate surface that is planar and an upper aperture and a lower plate defining a lower plate surface that is planar and a lower aperture, the locator pin being inserted through the upper and lower apertures and the bearing member being positioned between the upper and lower plates, the upper and lower apertures being larger than the bearing aperture such that the upper plate surface is parallel to and in mating contact with the first bearing surface and the lower plate surface is in mating contact with the second bearing surface, the first and second bearing surfaces and the upper and lower plate surfaces being perpendicular to the axis of rotation.

19. The friction clutch assembly of claim 18, wherein the bearing receiver further comprises a retention member secured to the floater having the upper and lower plates and bearing member captured between the retention member and the floater, the retention member defining a retention aperture having the locator pin inserted therethrough, the retention aperture being larger than the bearing aperture; and
wherein a biasing member is positioned between the retention member and the lower plate, the biasing member urging the lower plate against the bearing member.

* * * * *